(12) United States Patent
Hasegawa et al.

(10) Patent No.: US 11,316,316 B2
(45) Date of Patent: Apr. 26, 2022

(54) OPTICAL AMPLIFIER AND MULTI-CORE OPTICAL FIBER

(71) Applicant: SUMITOMO ELECTRIC INDUSTRIES, LTD., Osaka (JP)

(72) Inventors: Takemi Hasegawa, Yokohama (JP);
Tetsuya Hayashi, Yokohama (JP);
Yoshiaki Tamura, Yokohama (JP);
Hirotaka Sakuma, Yokohama (JP);
Shigehiro Nagano, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 427 days.

(21) Appl. No.: 16/293,883

(22) Filed: Mar. 6, 2019

(65) Prior Publication Data
US 2019/0207358 A1    Jul. 4, 2019

Related U.S. Application Data

(63) Continuation of application No. PCT/JP2017/032130, filed on Sep. 6, 2017.

(30) Foreign Application Priority Data

Sep. 9, 2016    (JP) .............................. JP2016-176796

(51) Int. Cl.
*H01S 3/067*    (2006.01)
*H04B 10/291*    (2013.01)
(Continued)

(52) U.S. Cl.
CPC ............ *H01S 3/06737* (2013.01); *G02B 6/02* (2013.01); *H01S 3/06754* (2013.01);
(Continued)

(58) Field of Classification Search
None
See application file for complete search history.

(56) References Cited

U.S. PATENT DOCUMENTS 10,234,632 B1 *    3/2019    Keeler ................. G02B 6/4206
2011/0235983 A1    9/2011    Hayashi et al.
(Continued)

FOREIGN PATENT DOCUMENTS

CN    105308805 A    2/2016
JP    H9-321368 A    12/1997
(Continued)

OTHER PUBLICATIONS

Saitoh, "Multicore Fiber Technology", Journal of Lightwave Technology, vol. 34, No. 1, Jan. 1, 2016, pp. 55-66. (Year: 2016).*
(Continued)

*Primary Examiner* — Eric L Bolda
(74) *Attorney, Agent, or Firm* — Faegre Drinker Biddle & Reath LLP (57)    ABSTRACT

The present embodiment relates to an optical amplifier and the like having a structure for enabling efficient use of pumping light while avoiding complication of a device structure. In such an optical amplifier, since pumping light from a pumping light source is supplied to each core of an amplification MCF, a coupling MCF in which adjacent cores form a coupled core is arranged between the amplification MCF and the pumping light source. The pumping light source is optically connected to a specific core of the coupling MCF, and pumping light is coupled from the specific core to remaining cores except the specific core in the coupling MCF before pumping light is supplied to each core of the amplification MCF. This enables coupling of pumping light between optically connected cores between the amplification MCF and the coupling MCF.

5 Claims, 4 Drawing Sheets

(51) Int. Cl.
  *G02B 6/02* (2006.01)
  *H01S 3/094* (2006.01)
  *H01S 3/16* (2006.01)
  *H04J 14/04* (2006.01)
  *H04B 10/2581* (2013.01)

(52) U.S. Cl.
  CPC .. H01S 3/094042 (2013.01); H01S 3/094065 (2013.01); H04B 10/2581 (2013.01); H04B 10/291 (2013.01); H04J 14/04 (2013.01); *H01S 3/06733* (2013.01); *H01S 3/094003* (2013.01); *H01S 3/1608* (2013.01)

(56) References Cited

U.S. PATENT DOCUMENTS

| | | | | |
|---|---|---|---|---|
| 2013/0114130 | A1* | 5/2013 | Stampoulidis | H01S 3/06737 359/341.32 |
| 2013/0308913 | A1 | 11/2013 | Tanigawa et al. | |
| 2015/0168642 | A1* | 6/2015 | Mimura | G02B 6/02042 359/341.3 |
| 2019/0115715 | A1 | 4/2019 | Hasegawa et al. | |

FOREIGN PATENT DOCUMENTS

| | | |
|---|---|---|
| JP | 2013-522914 A | 6/2013 |
| WO | WO-2011/116075 A1 | 9/2011 |

OTHER PUBLICATIONS

Hayashi, Tetsuya et al., "Coupled-Core Multi-Core Fibers: High-Spatial-Density Optical Transmission Fibers with Low Differential Modal Properties," Proc. ECOC, 2015, We.1.4.1, 3 pages.

Koshiba, Masanori et al., "Multi-core fiber design and analysis: coupled-mode theory and coupled-power theory," Oprics Express, 2011, vol. 19, No. 26, p. B102-p. B111.

Abedin et al., "Cladding-pumped erbium-doped multicore fiber amplifier," Optics Express, Aug. 27, 2012, vol. 20, No. 18, pp. 20191-20200. (Year: 2012).

* cited by examiner

Fig.4

OPTICAL AMPLIFIER AND MULTI-CORE OPTICAL FIBER

CROSS-REFERENCE TO RELATED APPLICATIONS

This application is a continuation application of PCT/JP2017/032130 claiming the benefit of priority of the Japanese Patent Application No. 2016-176796 filed on Sep. 9, 2016, the entire contents of which are incorporated herein by reference.

TECHNICAL FIELD

The present invention relates to an optical amplifier and a multi-core optical fiber to be applied thereto.

BACKGROUND ART

A multi-core optical fiber (hereinafter referred to as "MCF") having a plurality of cores in a single cladding is expected as a technique that increases a spatial density of an information transmission volume, and efficiently uses a limited cross sectional area of a communication path such as an underground pipeline and a submarine cable. Among the MCFs, a coupled-core multi-core optical fiber (hereinafter referred to as "CC-MCF") in which propagation modes are coupled between a plurality of cores is highly effective for increasing a spatial density of an information transmission volume since a distance between adjacent cores is short. This CC-MCF requires a technique of multi-input multi-output (MIMO) signal processing in order to distinguish between signals of a plurality of propagation modes propagating through a coupled core. Cost of MIMO signal processing increases with an increase in a delay time difference (hereinafter referred to as "differential mode delay: DMD") between propagation modes. As a technique for suppressing the increase of the DMD, for example, it is known that a group velocity difference between propagation modes can be reduced by appropriately setting a strength of coupling between cores. In addition, it is known that an accumulation speed of the DMD can be reduced from the first power to the one-half power of a fiber length by randomizing accumulation of the DMD, by causing mode-coupling by bending and twisting that occur at a time of practical use of the optical fiber. Such an MCF is called a coupled-mode coupled-core multi-core optical fiber (hereinafter referred to as "CM-CC-MCF") and is disclosed in Non-Patent Document 1.

Such a CM-CC-MCF typically has an inter-core mode-coupling coefficient of 1 [l/m] or more, or an inter-core power-coupling coefficient of 10 [l/km] or more. Here, the mode-coupling coefficient is a ratio of a complex amplitude of a component that is coupled to another propagation mode when a certain propagation mode propagates through a unit length. More specifically, as described in Non-Patent Document 2, the mode-coupling coefficient is defined as a coefficient of a mode-coupling equation. In this specification, in order to simplify the description, the mode-coupling coefficient between fundamental modes defined in respective adjacent cores is referred to as a mode-coupling coefficient between cores. In addition, the power-coupling coefficient is a ratio of a power of a component that is coupled to another propagation mode when a certain propagation mode propagates through a unit length. More specifically, as described in Non-Patent Document 2, the power coupling coefficient is defined as a coefficient of a power coupling equation. In this specification, in order to simplify the description, the power-coupling coefficient between fundamental modes defined in the respective adjacent cores is referred to as a power-coupling coefficient between cores.

In general, an optical amplifier is necessary to transmit an optical signal over a long distance. As an optical amplifying medium of an optical amplifier, it is known that utilization of a rare-earth-doped core optical fiber doped with a rare earth element, particularly erbium (Er), in a core through which an optical signal to be amplified propagates is efficient. However, causing the rare earth element to exhibit an optical amplification characteristic requires pumping light. In MCF, it is a problem to efficiently couple pumping light with a plurality of rare-earth-doped cores.

For example, Patent Document 1 above discloses an amplification MCF arranged with a pump core in which pumping light propagates on a central axis, and arranged with a plurality of cores (hereinafter referred to as "amplifier cores") doped with a rare earth element around the pump core. Signal light is amplified by respectively coupling signal lights from a plurality of cores of an MCF transmission path to a plurality of the amplifier cores.

CITATION LIST

Patent Literature

Patent Document 1: Japanese Unexamined Patent Publication No. 2013-522914

Non Patent Literature

Non-Patent Document 1: Tetsuya Hayashi, et al., "Coupled-Core Multi-Core Fibers: High Spatial-Density Optical Transmission Fibers with Low Differential Modal Properties," Proc. ECOC 2015, We.1.4.1 (2015)

Non-Patent Document 2: Masanori Koshiba et al., "Multi-core fiber design and analysis: coupled mode theory and coupled-power theory", Optics Express Vol. 19, No. 26, pp. B102-B111 (2011)

SUMMARY OF INVENTION

Technical Problem

As a result of considering a conventional amplification MCF applicable to an optical amplifier, the inventors have found the following problems. That is, in an amplification MCF in a conventional technique, a utilization efficiency of pumping light is low, and it has been difficult to couple pumping light to each core of a coupled-mode coupled-core MCF (CM-CC-MCF). In the amplification MCF described in Patent Document 1, pumping light that is coupled to the amplifier core to contribute to the amplification is a part of pumping light to be coupled to the pump core, and the remaining pumping light does not contribute to amplification. Therefore, the utilization efficiency of pumping light is low. In general, when a pump core in which pumping light locally exists does not spatially coincide with an amplifier core doped with a rare earth element, the utilization efficiency of the pumping light becomes low. This is because overlapping of the pumping light and the rare earth element becomes small, and as a result, a large proportion of power of the pumping light is dissipated without being absorbed by the rare earth element. From the viewpoint of the utilization efficiency of pumping light, it is advantageous to couple the pumping light to each of the plurality of amplifier cores. However, in the conventional technique, an optical system to couple pumping light to a plurality of amplifier cores increases the number of components, which has been a cause of high cost and low reliability.

The present invention has been made to solve the above-mentioned problems, and an object of the present invention is to provide an optical amplifier having a structure for enabling effective use of pumping light while avoiding complication of a device structure, and to provide an MCF applicable as an amplification MCF of the optical amplifier.

Solution to Problem

The present embodiment relates to an optical amplifier suitable for optical amplification in a system using a coupled-core multi-core optical fiber (CC-MCF) in which light propagates while power-coupling among a plurality of cores, and an MCF to be applied to the optical amplifier. Specifically, the optical amplifier according to the present embodiment comprises an amplification MCF, a coupling MCF, and a pumping light source, and the coupling MCF serves as an optical component that supplies pumping light to each core of the amplification MCF. The amplification MCF has a plurality of first cores each extending along a first central axis, and a first cladding surrounding each of the plurality of first cores. Each of the plurality of first cores is comprised of silica glass doped with a rare earth element. On the other hand, the first cladding is comprised of silica glass having a lower refractive index than that of each of the plurality of first cores. The coupling MCF has a plurality of second cores each extending along a second central axis, and a second cladding surrounding each of the plurality of second cores. Each of the plurality of second cores is comprised of silica glass and is optically connected to any one of the plurality of first cores. On the other hand, the second cladding is comprised of silica glass having a lower refractive index than that of the plurality of second cores. Further, the coupling MCF has a mode-coupling coefficient of 1 [l/m] or more at a wavelength of 980 nm, as an index indicating a coupling state between adjacent second cores among the plurality of second cores. The pumping light source is optically connected to at least one second core among the plurality of second cores. Further, the pumping light source supplies pumping light with a wavelength of 980 nm to each of the plurality of first cores via the coupling MCF. In such a configuration, in the optical amplifier, pumping light that is outputted from the pumping light source and is coupled to at least one second core is coupled from the at least one second core to the remaining second core except the at least one second core, and then coupled from each of the plurality of second cores to an optically connected first core among the plurality of first cores.

Advantageous Effects of Invention

According to the present embodiment, by coupling pumping light from the pumping light source to each core (amplification core) of the amplification MCF with use of coupling between cores in the coupling MCF, the structure for coupling the pumping light to each core of the amplification MCF can be simplified, and an optical amplifier with low cost and high reliability can be realized. Further, by using the CC-MCF with each core (amplifying core) doped with rare earth as an amplification fiber, it is possible to realize high overlapping of pumping light and a rare earth element, and as a result, the utilization efficiency of the pumping light can be increased.

DESCRIPTION OF EMBODIMENTS

Description of Embodiment of Present Invention

First, contents of each embodiment of the present invention will be individually listed and described.

(1) As an aspect of an optical amplifier according to the present embodiment, the optical amplifier comprises an amplification MCF, a coupling MCF, and a pumping light source, and the coupling MCF serves as an optical component that supplies pumping light to each core of the amplification MCF. The amplification MCF has a plurality of first cores each extending along a first central axis, and a first cladding surrounding each of the plurality of first cores. Each of the plurality of first cores is comprised of silica glass doped with a rare earth element. On the other hand, the first cladding is comprised of silica glass having a lower refractive index than that of each of the plurality of first cores. The coupling MCF has a plurality of second cores each extending along a second central axis, and a second cladding surrounding each of the plurality of second cores. Each of the plurality of second cores is comprised silica glass and is optically connected to any one of the plurality of first cores. On the other hand, the second cladding is comprised of silica glass having a lower refractive index than that of the plurality of second cores. Further, the coupling MCF has a mode-coupling coefficient of 1 [l/m] or more at a wavelength of 980 nm, as an index indicating a coupling state between adjacent second cores among the plurality of second cores. The pumping light source is optically connected to at least one second core among the plurality of second cores. Further, the pumping light source supplies pumping light with a wavelength of 980 nm to each of the plurality of first cores via the coupling MCF. In such a configuration, in the optical amplifier, pumping light that is outputted from the pumping light source and is coupled to at least one second core is coupled from the at least one second core to the remaining second core except the at least one second core, and then coupled from each of the plurality of second cores to an optically connected first core among the plurality of first cores.

According to this aspect, before pumping light is supplied to each of a plurality of cores of the amplification MCF, in the coupling MCF having a plurality of cores each optically connected to any one of the plurality of cores of the amplification MCF, pumping light previously coupled from the pumping light source to at least one second core (specific core) is coupled from the specific core to the remaining second core except the specific core, making it possible to couple the pumping light between the plurality of second cores of the coupling MCF and the plurality of first cores of the amplification MCF (between the cores optically connected to each other). This can effectively reduce a size and power consumption of the optical amplifier that amplifies signal light transmitted through a transmission path formed by a coupled-core MCF (transmission MCF).

(2) As an aspect of the optical amplifier according to the present embodiment, in a cross section orthogonal to a first central axis, of an amplification multi-core optical fiber, one first core among the plurality of first cores is preferably located on the first central axis. Further, in a cross section orthogonal to a second central axis, of a coupling multi-core optical fiber, one second core among a plurality of second cores is preferably located on the second central axis. The pumping light source includes a single-mode optical fiber (hereinafter referred to as "SMF") having a single core extending along a third central axis in a state including the third central axis and a third cladding surrounding the single core and having a lower refractive index than that of the single core, and pumping light is outputted from the single core of the SMF. In such a configuration, the SMF and the coupling MCF are arranged so that the single core is optically connected to the second core located on the second central axis. According to this aspect, it is possible to further miniaturize the optical amplifier that amplifies signal light transmitted through a transmission path formed by the CC-MCF. Meanwhile, in an aspect of the optical amplifier according to the present embodiment, the rare earth element may include Er (erbium), and in that case, a pump wavelength is preferably 980 nm or 1480 nm.

(3) The MCF according to the present embodiment is applicable to an amplification MCF of an optical amplifier having the above-described structure, and has a plurality of cores, a cladding, and a resin coating. Each of the plurality of cores extends along a predetermined central axis, and is comprised of silica glass doped with a rare earth element. The cladding surrounds each of the plurality of cores, and is comprised of silica glass having a lower refractive index than that of each of the plurality of cores. The resin coating is comprised of a resin surrounding an outer peripheral surface of the cladding. Further, the MCF applicable to the above-mentioned amplification MCF has a mode-coupling coefficient of 1 [1/m] or more at a wavelength of 1550 nm, as an index indicating a coupling state between adjacent cores among the plurality of cores. According to this aspect, it is possible to realize an optical amplifier that amplifies signal light transmitted through a transmission path formed by the CC-MCF in a saved space with low power consumption.

(4) As an aspect of the MCF according to the present embodiment, the plurality of cores preferably include one core extending along a central axis in a state including the central axis. According to this aspect, it is possible to realize an optical amplifier that amplifies signal light transmitted through a transmission path formed by the CC-MCF in a further saved space As described above, each aspect listed in this Description of Embodiment of Present Invention can be applied to all of the remaining aspects or to all combinations of these remaining aspects.

Details of Embodiment of Present Invention

Specific examples of the optical amplifier and the multi-core optical fiber (MCF) according to the present invention will be described in detail below with reference to the attached drawings. It should be noted that the present invention is not limited to these illustrative examples, but is indicated by the claims, and it is intended to include meanings equivalent to the claims and all modifications within the scope. Moreover, in the description of the drawings, the same elements are denoted by the same reference numerals, and redundant descriptions are omitted.

Figure 1:
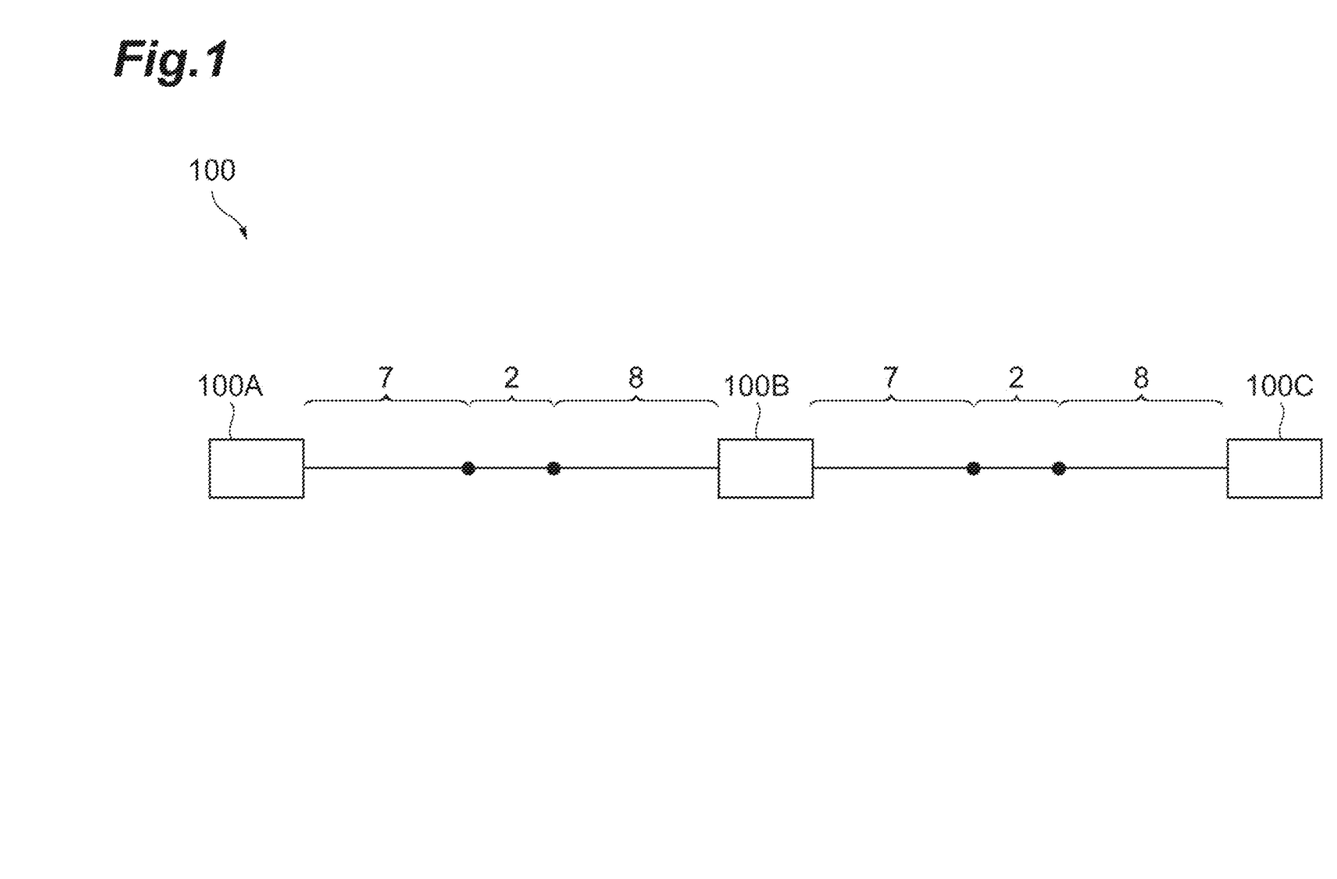
FIG. 1 is a view showing an example of a schematic configuration of an optical communication system that can be applied with an optical amplifier according to the present embodiment.

FIG. 1 is a view showing an example of a schematic configuration of an optical communication system 100 that can be applied with an optical amplifier according to the present embodiment. The optical communication system 100 in FIG. 1 includes: a plurality of base stations 100A to 100C; and transmission paths laid respectively between the base station 100A and the base station 100B, and between the base station 100B and the base station 100C. Each transmission path laid between the base stations is formed by a CC-MCF (transmission MCF), and an optical amplifier 2 according to the present embodiment is arranged on this transmission path. Specifically, the transmission path laid between the base station 100A and the base station 100B includes: the optical amplifier 2 according to the present embodiment; a first transmission MCF (input-side CC-MCF) 7 arranged between the base station 100A and the optical amplifier 2; and a second transmission MCF (output-side CC-MCF) 8 arranged between the optical amplifier 2 and the base station 100B. It should be noted that, in the example of FIG. 1, a configuration of the transmission path laid between the base station 100B and the base station 100C also has the same structure as the transmission path laid between the base station 100A and the base station 100B. Further, in the example of FIG. 1, each transmission path between the base stations is formed by only one system, but may be formed by two or more systems for improving reliability.

Figure 2:
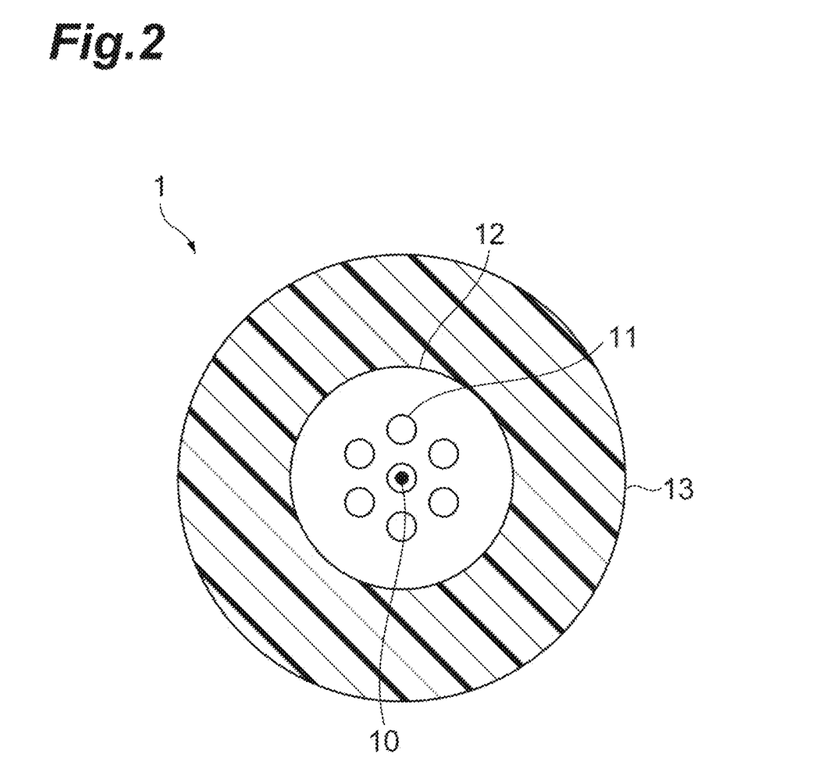
FIG. 2 is a view showing a cross-sectional structure of a multi-core optical fiber according to the present embodiment.

FIG. 2 is a view showing a cross-sectional structure of an amplification MCF 1 (MCF according to the present embodiment) applicable to the optical amplifier 2 of FIG. 1. This FIG. 2 shows a cross section orthogonal to a central axis 10, of the amplification MCF 1. As shown in FIG. 2 (cross-sectional view), the amplification MCF 1 includes: seven cores (first cores) 11 arranged substantially symmetrically around the central axis 10 and on the central axis 10; a cladding (first cladding) 12 surrounding each of the cores 11; and a coating 13 provided on an outer peripheral surface of the cladding 12. In addition, the cladding 12 and the coating 13 are arranged substantially concentrically. Each of the core 11 and the cladding 12 is comprised of silica glass as a main component, and Er is doped to the core 11 as a rare earth element for optical amplification. In order to further optimize an amplification characteristic and a refractive index, an element such as Ge or Al is preferably doped to the core 11. The coating is comprised of an ultraviolet curing resin. Further, although not shown in the figure, the coating (resin coating) 13 may be formed by a plurality of layers. In a case where the coating 13 is formed by a plurality of layers, in particular, an inner layer adjacent to the cladding 12 preferably has a lower Young's modulus than that of an outer layer including an outer peripheral surface of the coating 13, in order to attenuate a component acting on the glass and causing microbending among random external forces acting from the outer peripheral surface side of the amplification MCF 1.

The amplification MCF 1 propagates pumping light having a wavelength of 980 nm or 1480 nm for pumping Er, and propagates and amplifies signal light having a wavelength of 1530 to 1610 nm typically used for optical communication. A diameter of each of the cores 11 is preferably 4 to 16 μm. This causes a fundamental mode defined by an individual core to be confined within the core with an appropriate strength (guarantee of propagation within the core of a specified mode), and attenuates a higher-order mode by bending the amplification MCF 1 (prevention of propagation of the higher-order mode), enabling prevention of an increase in the DMD. A diameter of the cladding 12 is 124 to 126 µm. This facilitates connection of the amplification MCF 1 to widely used connectors. The coating 13 has an outer diameter of 240 to 260 µm, which makes it possible to suppress loss due to intermittent slight bending (microbending) occurring when the amplifying MCF 1 is actually used. It should be noted that, in this specification, an optical characteristic generated in a case of paying attention to one core and assuming that other cores are not present is called an optical characteristic defined by individual cores.

Further, in the amplification MCF 1, an interval between adjacent cores is preferably equal to a core diameter or more and equal to 30 µm or less, and an inter-core mode-coupling coefficient is preferably 1 [l/m] or more or an inter-core power-coupling coefficient is 10 [l/m] or more at a wavelength of 1550 nm. Furthermore, it is preferable that the core of the CM-CC-MCF extends helically along an axis around the axis, and a period of the helix is 0.5 [m] or less, thereby causing mode-coupling and allowing the DMD to be accumulated in proportion to the 0.5 to 0.7 power of a fiber length.

Figure 3:
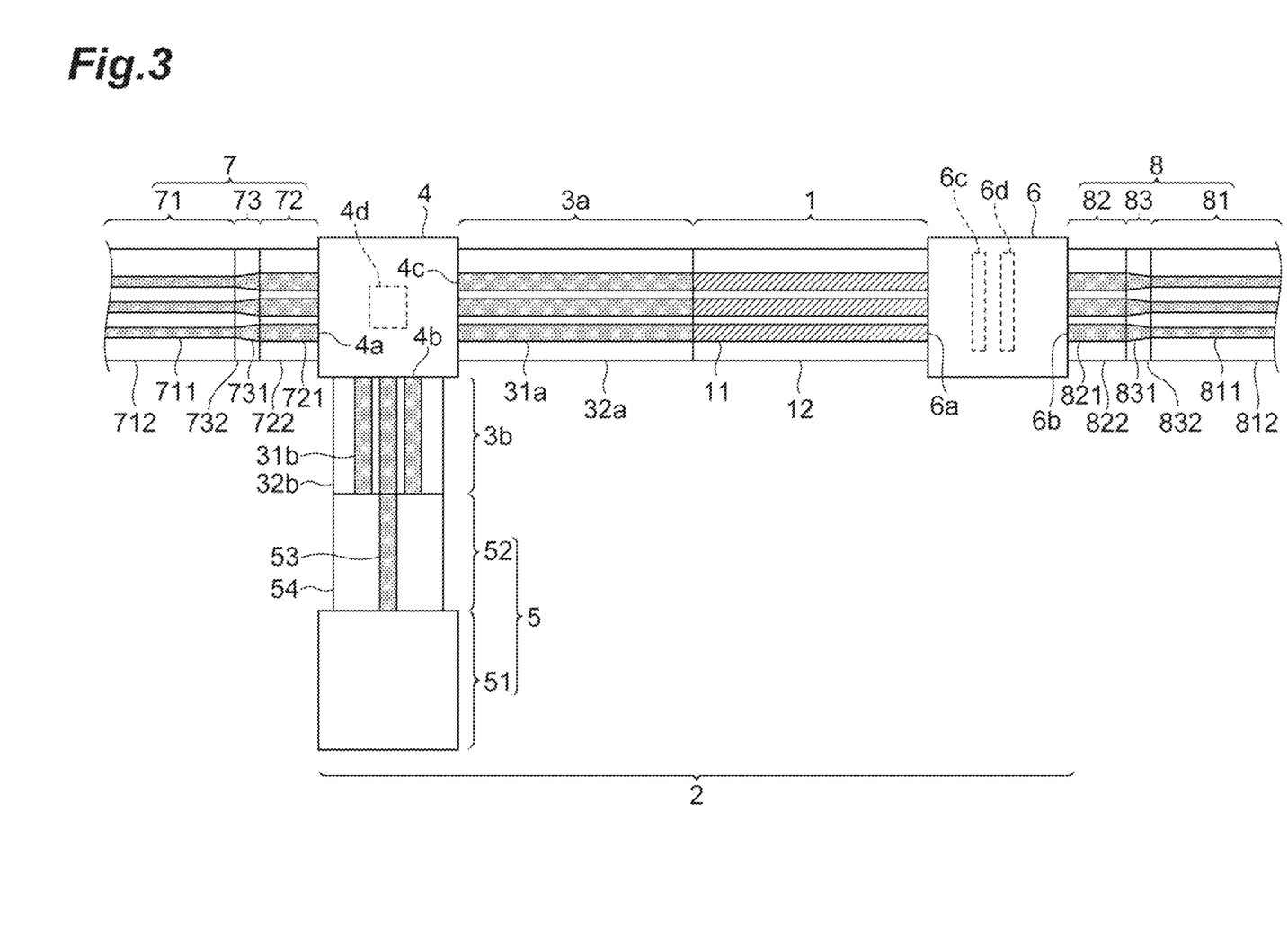
FIG. 3 is a view showing an example of a configuration of an optical amplifier according to a first embodiment.

FIG. 3 is a view showing an example of a configuration of an optical amplifier 2 according to a first embodiment. In the system of FIG. 1, the optical amplifier 2 forms a part of a transmission path laid between individual base stations. Meanwhile, the coating of each optical fiber is omitted in FIG. 2 in order to show an optical configuration, but it is desirable to improve a mechanical strength and removability of a cladding mode by properly coating each optical fiber. As shown in FIG. 3, the optical amplifier 2 according to the first embodiment is arranged between a first transmission MCF 7 and a second transmission MCF 8, and includes a multiplexer/demultiplexer 4, a pumping light source 5, a coupling MCF, an amplification MCF 1 having the above structure, and an optical filter 6. The amplification MCF 1 is arranged between the multiplexer/demultiplexer 4 and the optical filter 6. The coupling MCF includes: a first coupling MCF 3a arranged between the multiplexer/demultiplexer 4 and the amplification MCF 1; and a second coupling MCF 3b arranged between the multiplexer/demultiplexer 4 and the pumping light source 5. Further, the pumping light source 5 includes: a light emitting part 51; and an SMF (pumping fiber) 52 having a single core and arranged between the light emitting part 51 and the second coupling MCF 3b.

To an input end face of the amplification MCF 1 shown in FIG. 2, an output end face of the first coupling MCF 3a is connected. The first coupling MCF 3a has a core arrangement (the number of cores and a core interval) substantially coincident with the amplification MCF 1 (FIG. 2), and includes a plurality of cores (second cores) 31a, and a cladding (second cladding) 32a surrounding each of the cores 31a. Further, similarly to the amplification MCF 1, the first coupling MCF 3a is an MCF comprised of silica glass as a main material, and has a plurality of cores that are mode-coupled. Meanwhile, no rare earth element such as Er is doped to each core of the first coupling MCF 3a, and signal light and amplification pumping light are propagated while being mode-coupled. In addition, when the first coupling MCF 3a includes a core comprised of pure silica glass and a cladding doped with F, a boundary between the core and the cladding becomes clear. Therefore, such a configuration is preferable in order to facilitate alignment. As another preferable configuration, the first coupling MCF 3a may include a plurality of cores doped with Ge, and a cladding comprised of pure silica glass, and an optical fiber having such a structure can be manufactured with a lower cost.

An input end face of the first coupling MCF 3a is coupled to an output port 4c of the multiplexer/demultiplexer 4. It should be noted that the multiplexer/demultiplexer 4 has a multiplexing and demultiplexing element 4d, and has a signal light input port 4a coupled with an output end face of the first transmission MCF 7, a pumping light input port 4b coupled with an output end face of the second coupling MCF 3b, and the output port 4c coupled with the input end face of the first coupling MCF 3a. Signal light coupled to the signal light input port 4a via the first transmission MCF 7 and pumping light coupled to the pumping light input port 4b via the second coupling MCF 3b are multiplexed by the multiplexing and demultiplexing element 4d, and this multiplexed light is outputted from the output port 4c. The multiplexing and demultiplexing element 4d includes an optical system including a dielectric multilayer film filter and an optical element such as a lens.

The first transmission MCF 7 has a core arrangement (the number of cores and a core interval) substantially coincident with the amplification MCF 1 (FIG. 2). The first transmission MCF 7 (substantially corresponding to a transmission section 71) includes a plurality of cores 711 and a cladding 712 surrounding each of the cores 711. Further, similarly to the first and second coupling MCFs 3a and 3b, the first transmission MCF 7 is an MCF comprised of silica glass with a plurality of mode-coupled cores not doped with a rare earth element, and includes a core comprised of pure silica glass and a cladding doped with F, or a core doped with Ge and a cladding comprised of pure silica glass.

As described in the Non-Patent Document 1, the first transmission MCF 7 is designed to cause optical communication signal light having a wavelength of 1530 to 1610 nm to most effectively generate mode-coupling, and to propagate with a small delay time difference DMD between modes. Further, as shown in the example of FIG. 3, the first transmission MCF 7 preferably has a core-enlargement section 72 whose core diameter is enlarged at an end part coupled to the multiplexer/demultiplexer 4. This configuration enables reduction of coupling loss due to axial misalignment. On the other hand, if the core diameter is too large in the transmission section 71 not belonging to the end part, a difference in a propagation constant between the propagation modes becomes large, mode-coupling is unlikely to occur, and the delay time difference DMD between the modes increases. Therefore, in the transmission section 71, the core diameter is preferably small to an extent that nonlinearity does not cause a problem. Furthermore, between the transmission section 71 and the core-enlargement section 72 having different core diameters, it is desirable that there is a transition section 73 in which the core diameter changes continuously, enabling reduction of light loss due to mode inconsistent. Moreover, the core-enlargement section 72 includes a plurality of cores 721 and a cladding 722 surrounding each of the cores 721. The transition section 73 includes a plurality of cores 731 and a cladding 732 surrounding each of the cores 731. The core diameter is different in all of the sections, but the core arrangement itself is the same as the core arrangement shown in FIG. 2.

For example, the transition section 73 and the core-enlargement section 72 at the end part of the first transmission MCF 7 are obtained by heating the end part of the transmission section 71 by arc discharge or flame, and the cores 731 and 721 are formed by diffusing Ge or F doped to the core 711. At this time, it is desirable to keep the outer diameter of the claddings 732 and 722 constant by suppressing a heating amount within a certain limit, thereby avoiding a decrease of mechanical strength.

The second coupling MCF 3b has substantially the same structure as the first coupling MCF 3a. That is, the second coupling MCF 3b has a core arrangement (the number of cores and a core interval) substantially coincident with the amplification MCF 1 (FIG. 2), and includes a plurality of cores (second cores) 31b, and a cladding (second cladding) 32b surrounding each of the cores 31b. Further, the second coupling MCF 3b mode-couples and propagates pumping light having a wavelength of 980 nm or 1480 nm for pumping Er and amplifying signal light. In particular, mode-coupling is unlikely to occur at a wavelength 980 nm since light confinement of core 31b is stronger than that of a signal light wavelength of 1530 to 1610 nm. Therefore, the second coupling MCF 3b is configured such that mode-coupling occurs at a wavelength of 980 nm, by reducing a refractive index difference between the core and the cladding of the second coupling MCF 3b as compared with the first transmission MCF 7, to weaken the light confinement at the core 31b. It should be noted that this structure also applies to the first coupling MCF 3a. In each of the first and second coupling MCFs 3a and 3b, a specific refractive index difference, a core interval, and a fiber length are selected so that pumping light inputted to at least one core (second core) is coupled to each of the remaining cores (second cores).

To another end face of the second coupling MCF 3b, the pumping light source 5 is coupled. The pumping light source 5 includes: the light emitting part 51 formed by a semiconductor laser diode configured to generate pumping light; and the pumping fiber 52 configured to transmit the generated pumping light. Meanwhile, the pumping fiber 52 is a general SMF having a single core 53 and a cladding 54. In a cross-sectional structure of this pumping fiber 52, referring to the example of FIG. 2, the core 11 located on the central axis 10 corresponds to the single core 53, and the cladding 12 of FIG. 2 corresponds to the cladding 54 of the pumping fiber 52.

In particular, each of the first and second coupling MCFs 3a and 3b preferably has a core arrangement in which one of the plurality of cores 31a and 31b is arranged on the central axis. As a result, by connecting the SMF coaxially, pumping light is coupled from the core 53 of the pumping fiber (SMF) 52 to the core (specific core) 11 located on the central axis of the second coupling MCF 3b, and the pumping light is also coupled to the remaining cores except the specific core while propagating through the first and second coupling MCFs 3a and 3b. This connection configuration can realize coupling of pumping light from the pumping light source 5 to each core of the amplification MCF 1 with a small occupied space similar to the connection between conventional SMFs. Further, in this preferred embodiment, it is desirable that all of the amplification MCF 1, the first transmission MCF 7, and the second transmission MCF 8 have a core arrangement in which one of the plurality of cores is located on the central axis. In this case, highly efficient pumping-light-coupling becomes possible between individual MCFs.

In the present embodiment, light generated in one laser diode (light emitting part 51) is equally distributed to a plurality of cores by using mode-coupling in the coupling MCFs (first and second coupling MCFs 3a and 3b). Thereafter, by connecting the first coupling MCF 3a and the amplification MCF 1 (optically connecting the plurality of cores 31a and the plurality of cores 11 respectively), pumping light is supplied to each of the plurality of cores 11 of the amplification MCF 1. By adopting such a pumping light supply structure, even in a case where the number of cores of each MCF forming the transmission path including the amplification MCF 1 increases, it is possible to efficiently supply the pumping light to each core 11 of the amplification MCF 1 without increasing the number of laser diodes (light emitting part 51). This enables reduction of manufacturing cost, a device size, and power consumption of the optical amplifier. Moreover, suppression of the device size and the power consumption of the optical amplifier is particularly advantageous in submarine cable systems having large restrictions on a size of a repeater placed on a transmission path and power supply.

Meanwhile, as compared to other prior arts, in the amplification MCF having a pump core disclosed in the above-mentioned Patent Document 1, while pumping light is supplied through mode-coupling from one pump core to a plurality of amplification cores, there is a problem that signal light coupled from the amplification core to the pump core becomes loss. On the other hand, the optical amplifier according to the present embodiment solves such a problem.

Returning to the example of FIG. 3, the output end face of the amplification MCF 1 is coupled to an input port 6a of the optical filter 6. Meanwhile, the optical filter 6 has the input port 6a coupled to the output end face of the amplification MCF 1, and an output port 6b coupled to an input end face of the second transmission MCF 8. Further, the optical filter 6 internally has an optical isolator 6c and a bandpass filter 6d, and also includes an optical element such as a lens (not shown). The optical isolator 6c blocks noise light such as Rayleigh scattered light and Fresnel reflection light propagated from the second transmission MCF 8 in the opposite direction toward the amplification MCF 1, and reduces noise of the optical amplifier. The bandpass filter 6d blocks spontaneous emission light (ASE light) and remaining pumping light that are inputted from the amplification MCF 1, and reduces noise of the optical amplifier.

The second transmission MCF 8 has a core arrangement (the number of cores and a core interval) substantially coincident with the amplification MCF 1 (FIG. 2). Further, similarly to the first transmission MCF 7, the second transmission MCF 8 has a transmission section 81, a core-enlargement section 82, and a transition section 83. The transmission section 81 has a plurality of mode-coupled cores 811 and a cladding 812 surrounding each of the cores 811. The core-enlargement section 82 has a plurality of cores 821 and a cladding 822 surrounding each of the cores 821. The transition section 83 has a plurality of cores 831 whose core diameters are continuously enlarged, and a cladding 832 surrounding each of the cores 831 and having an outer diameter maintained constant. This second transmission MCF 8 allows signal light (output light) amplified by the optical amplifier 2 to propagate to a receiver or a next optical amplifier via the transmission section 81. Moreover, the second transmission MCF 8 also has substantially the same structure as the first transmission MCF 7.

Figure 4:
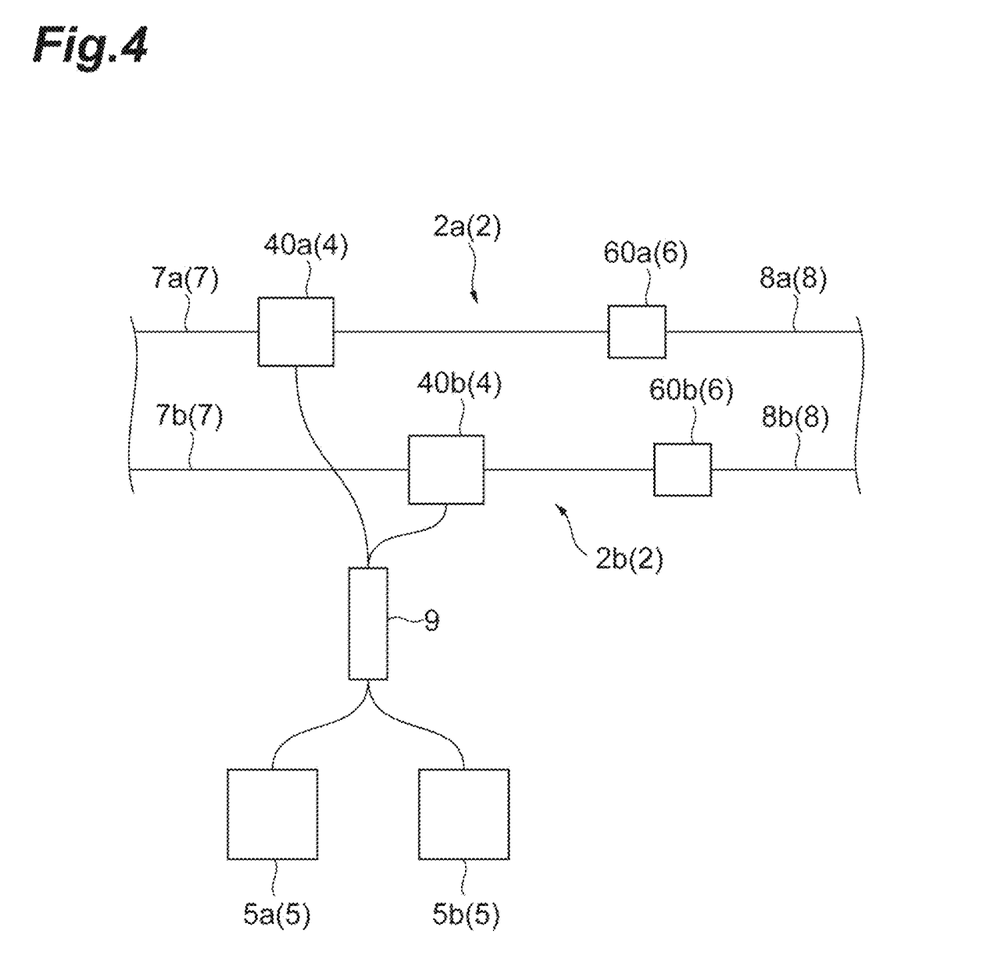
FIG. 4 is a view showing an example of a configuration of an optical amplifier according to a second embodiment.

FIG. 4 is a view showing an example of a configuration of an optical amplifier according to a second embodiment. The optical amplifier according to the second embodiment is an optical amplifier applicable in a case where a transmission path between base stations in the optical communication system 100 in FIG. 1 is configured with two systems, and the optical amplifier is configured by two optical amplifiers 2a and 2b to be pumped by two pumping light sources 5a and 5b. This configuration allows amplification of signal lights propagating respectively through transmission paths of two systems (a transmission path from a first transmission MCF 7a to a second transmission MCF 8a, and a transmission path from a first transmission MCF 7b to a second transmission MCF 8b). Specifically, among the two amplification systems, signal light amplified by the optical amplifier 2a is sent from an optical filter 60a to the second transmission MCF 8a, and signal light amplified by the optical amplifier 2b is sent from an optical filter 60b to the second transmission MCF 8b. Further, pumping lights respectively outputted from the pumping light sources 5a and 5b are multiplexed by an optical coupler 9, and then coupled to two multiplexer/demultiplexers 40a and 40b. It should be noted that the two first transmission MCFs 7a and 7b in FIG. 4 each correspond to the first transmission MCF 7 in FIG. 3, and the two second transmission MCFs 8a and 8b each correspond to the second transmission MCF 8 in FIG. 3. The two pumping light sources 5a and 5b in FIG. 4 each correspond to the pumping light source 5 in FIG. 3, the two multiplexer/demultiplexers 40a and 40b in FIG. 4 each correspond to the multiplexer/demultiplexer 4 in FIG. 3, and the two optical filters 60a and 60b in FIG. 4 each correspond to the optical filter 6 in FIG. 3.

As described above, the optical amplifier according to the second embodiment has a configuration in which, even when one of the pumping light sources 5a and 5b fails, pumping light is supplied from the other one. Therefore, an operation of at least one transmission system of the optical amplifier can be maintained. As described above, according to the second embodiment, since an operation-stopped state of the entire optical amplifier can be avoided with a structure having a small number of components, high reliability can be realized with a small volume (device storage capacity). Such structural characteristics are particularly important in submarine cable systems.

REFERENCE SIGNS LIST

1 . . . amplification MCF; 2, 2a, 2b . . . optical amplifier; 3a . . . first coupling MCF; 3b . . . second coupling MCF; 4, 40a, 40b . . . multiplexer/demultiplexer; 5, 5a, 5b . . . pumping light source; 6, 60a, 60b . . . optical filter; 7, 7a, 7b . . . first transmission MCF; 8, 8a, 8b . . . second transmission MCF; 51 . . . light emitting part; 52 . . . pumping fiber (single core SMF); 11, 31a, 31b, 711, 721, 731, 811, 821, 831 . . . core; 12, 32a, 32b, 712, 722, 732, 812, 822, 832 . . . cladding; 13 . . . coating; 100 . . . optical communication system; and 100A to 100C . . . base station

The invention claimed is:

1. An optical amplifier comprising:
an amplification multi-core optical fiber having: a plurality of first cores each extending along a first central axis and comprised of silica glass doped with a rare earth element; and a first cladding surrounding each of the plurality of first cores and comprised of silica glass;
a coupling multi-core optical fiber having: a plurality of second cores each extending along a second central axis and optically connected to any one of the plurality of first cores, each of the plurality of second cores having a core diameter of 4 to 16 μm and an interval between adjacent ones of the second cores being equal to the core diameter or more and equal to 30 μm or less, the plurality of second cores each comprised of silica glass; and a second cladding surrounding each of the plurality of second cores and comprised of silica glass, the coupling multi-core optical fiber having a mode-coupling coefficient of 1 [l/m] or more at a predetermined pump wavelength capable of pumping the rare earth element; and
a pumping light source optically connected to at least one second core among the plurality of second cores and configured to supply pumping light of the predetermined pump wavelength to each of the plurality of first cores through the coupling multi-core optical fiber, wherein
the pumping light from the pumping light source, coupled to the at least one second core, is coupled from the at least one second core to each remaining second core except the at least one second core, and then coupled from each of the plurality of second cores to an optically connected first core among the plurality of first cores.

2. The optical amplifier according to claim 1, wherein the rare earth element includes erbium, and the predetermined pump wavelength is 980 nm.

3. The optical amplifier according to claim 1, wherein
in a section of the amplification multi-core optical fiber that is taken orthogonally to the first central axis, one of the plurality of first cores is positioned on the first central axis;
in a section of the coupling multi-core optical fiber that is taken orthogonally to the second central axis, one of the plurality of second cores is positioned on the second central axis;
the pumping light source includes a single core single-mode optical fiber including a third core containing and extending along a third central axis, and a third cladding surrounding the third core; and
the single-core single-mode optical fiber and the coupling multi-core optical fiber are arranged such that the third core and the second core that is positioned on the second central axis are optically connected to each other, and the pump light is coupled to the remaining cores excluding the second core that is positioned on the second central axis while being propagated through the coupling multi-core optical fiber.

4. A multi-core optical fiber comprising:
a plurality of cores each extending along a predetermined central axis and comprised of silica glass doped with a rare earth element;
a cladding surrounding each of the plurality of cores and comprised of silica glass; and
a resin coating surrounding an outer peripheral surface of the cladding, wherein
each of the plurality of cores has a core diameter of 4 to 16 μm,
an interval between adjacent cores of the plurality of cores is equal to the core diameter or more and equal to 30 μm or less, and
the multi-core optical fiber has a mode-coupling coefficient of 1 [l/m] or more at a wavelength of 1550 nm as an index indicating a coupling state between the adjacent cores among the plurality of cores.

5. The multi-core optical fiber according to claim 4, wherein the plurality of cores include one core extending along the predetermined central axis in a state including the predetermined central axis.

* * * * *